(12) United States Patent
Bonaventura, Jr.

(10) Patent No.: US 6,279,240 B1
(45) Date of Patent: Aug. 28, 2001

(54) EXTENSIBLE CARPENTER'S LEVEL

(76) Inventor: Anthony Louis Bonaventura, Jr., 52 Montrose Ave., Columbus, OH (US) 43015

(*) Notice: Subject to any disclaimer, the term of this patent is extended or adjusted under 35 U.S.C. 154(b) by 0 days.

(21) Appl. No.: 09/329,871

(22) Filed: Jun. 11, 1999

Related U.S. Application Data

(60) Provisional application No. 60/089,099, filed on Jun. 12, 1998.

(51) Int. Cl.[7] .................................................. G01C 9/26
(52) U.S. Cl. ................................. 33/374; 33/375; 33/451
(58) Field of Search .......................... 33/374, 375, 376, 33/370, 371, 372, 373, 296, 451, 809

(56) References Cited

U.S. PATENT DOCUMENTS

| | | | |
|---|---|---|---|
| 2,419,451 | * 4/1947 | Keller | 33/374 |
| 4,060,902 | 12/1977 | Keller | 33/403 |
| 4,130,943 | 12/1978 | Talbot | 33/374 |
| 4,317,289 | 3/1982 | Conn | 33/498 |
| 4,435,908 | * 3/1984 | Semler, Jr. | 33/376 |
| 4,593,475 | * 6/1986 | Mayes | 33/347 |
| 4,607,437 | * 8/1986 | McSorley, Sr. et al. | 33/374 |
| 4,928,395 | 5/1990 | Good | 33/374 |
| 6,041,510 | * 3/2000 | Huff | 33/374 |

* cited by examiner

*Primary Examiner*—Diego Gutierrez
*Assistant Examiner*—R. Alexander Smith
(74) *Attorney, Agent, or Firm*—Standley & Gilcrest LLP

(57) ABSTRACT

The present invention is an extensible carpenter's level that is adjustable between a collapsed position and a fully-extended position. The level may be manufactured in a variety of sizes. A preferred embodiment of the level is comprised of an innerslide and two outerslides. The innerslide has two sets of tracks or tongues. Each of the outerslides is slidably connected to the innerslide. In particular, one outerslide is adapted to slide along one set of tracks or tongues, and the other outerslide is adapted to slide along the other set of tracks or tongues. At least one of the slides includes at least one level bubble. The level preferably includes multiple level bubbles to enable a variety of measurements, e.g., a horizontal level, a vertical level, and a 45° level.

24 Claims, 19 Drawing Sheets

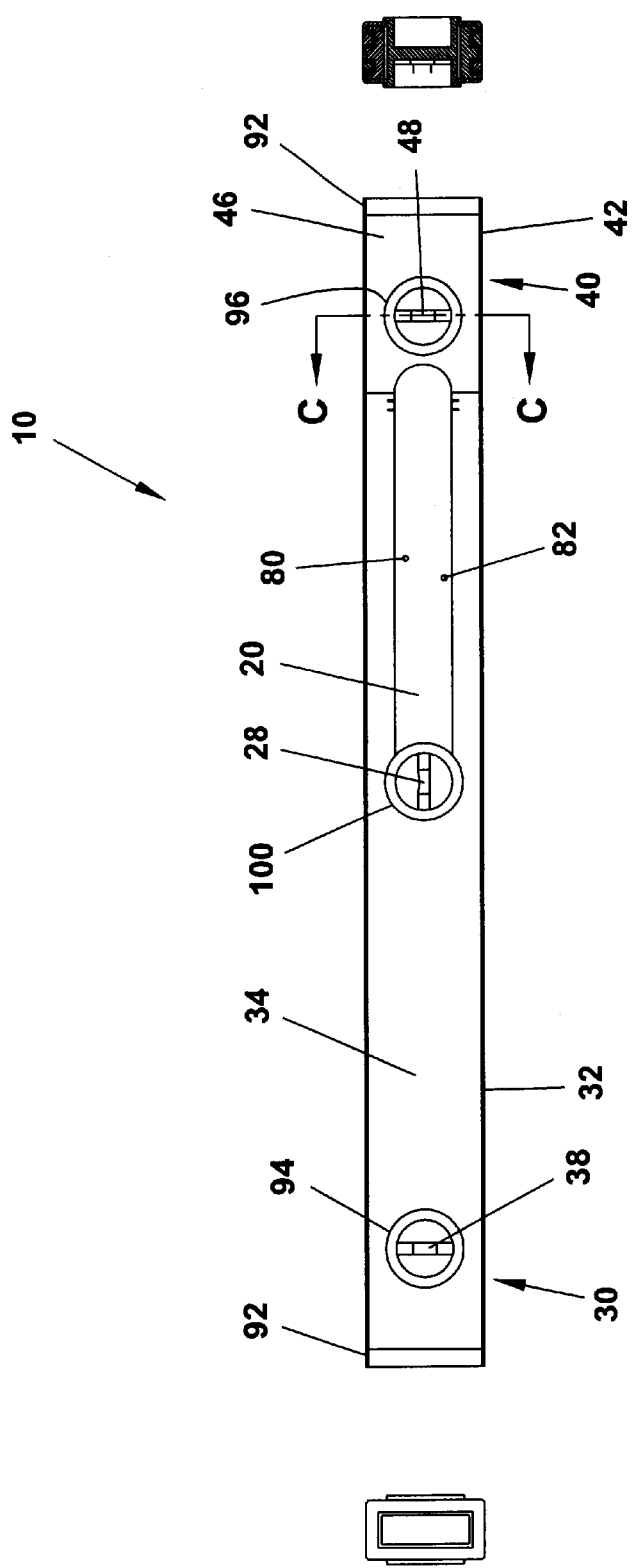

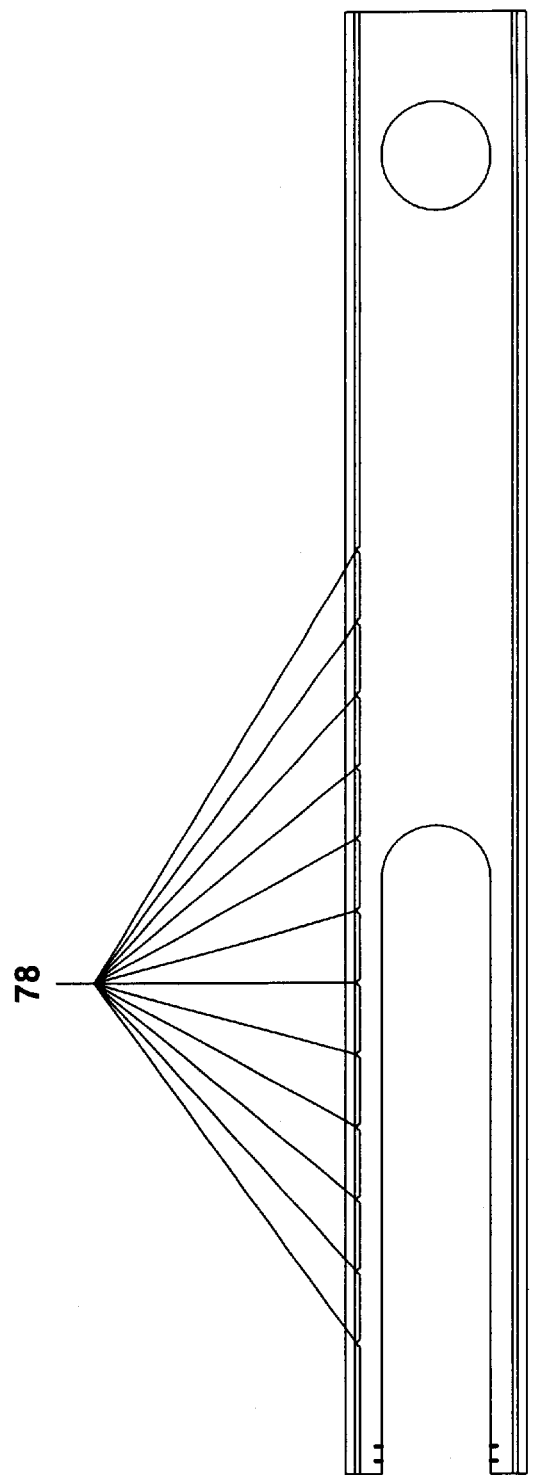
FIG. 8A
FIG. 8B

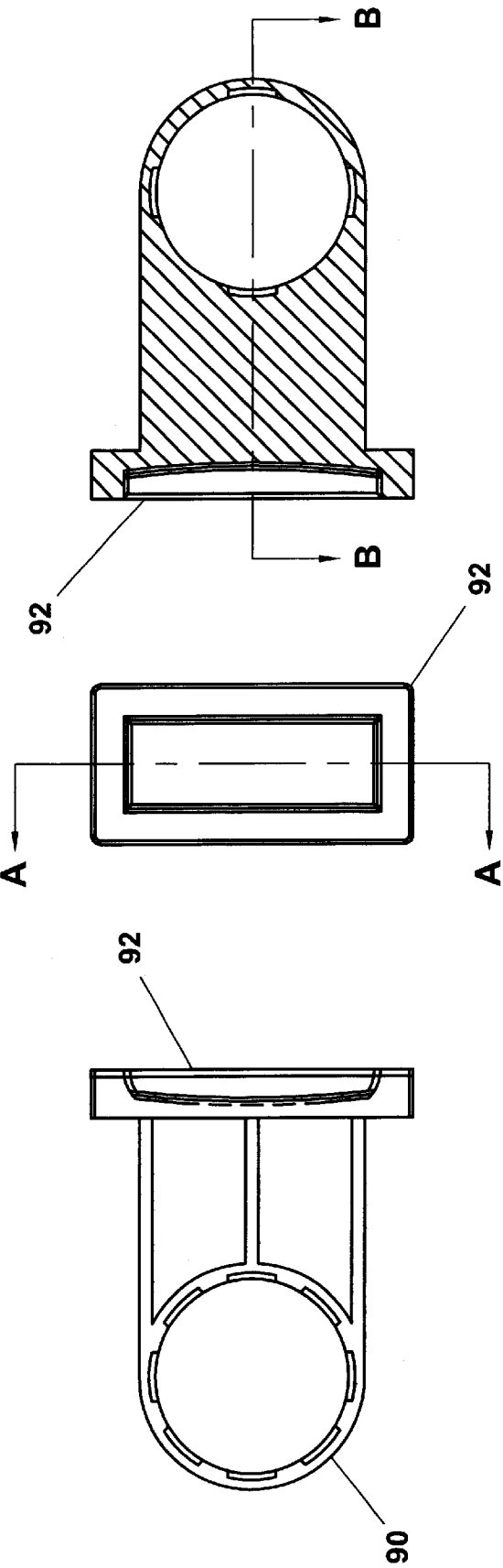

(SECTION A-A)

(SECTION A-A)

(SECTION A-A)

(SECTION B-B)

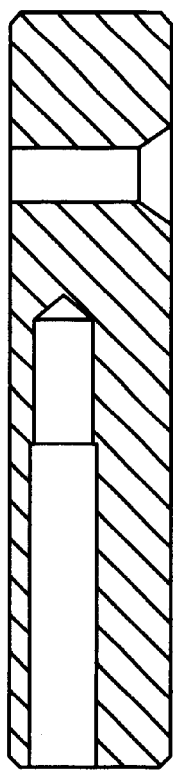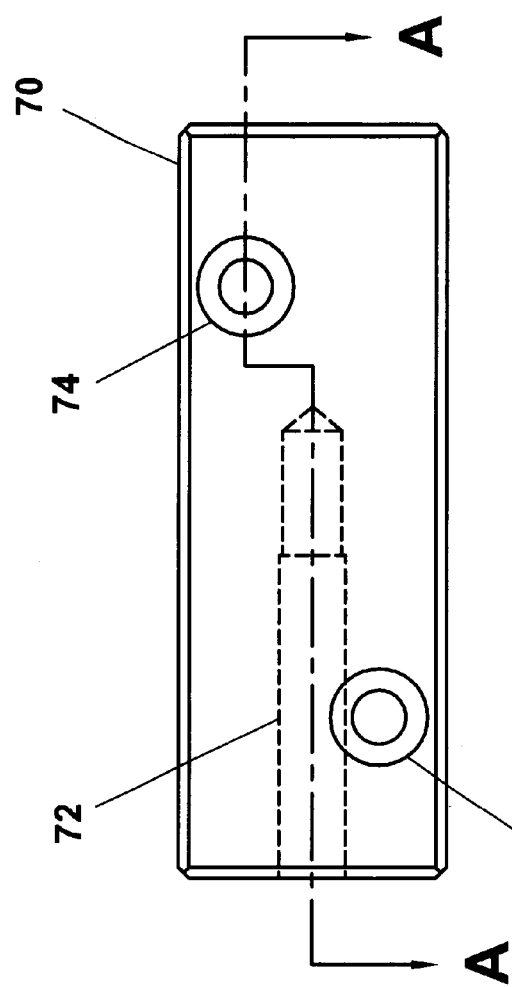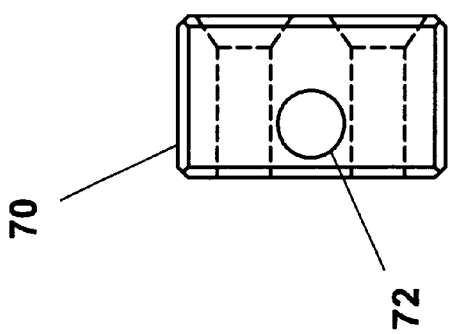

(SECTION A-A)

EXTENSIBLE CARPENTER'S LEVEL

This application claims the benefit of U.S. Provisional Application No. 60/089,099, filed Jun. 12, 1998.

BACKGROUND AND SUMMARY OF THE INVENTION

The present invention relates generally to a carpenter's level, and more particularly, to an extensible carpenter's level. A carpenter's level may be used to determine the angular position of a given plane or surface relative to a reference plane or surface. A carpenter's level generally includes a level bubble mounted in a housing. The level bubble is mounted in the housing at a predetermined orientation relative to a reference edge of the housing. As a result, the angular position of a surface may be determined by placing the reference edge of the housing against the surface.

In order to achieve optimum accuracy, the length of the reference edge of the housing is preferably about equal to the length of the surface to be checked. If the reference edge is too short, the carpenter's level may be overly sensitive to undulations in the surface. On the other hand, the carpenter's level may be unnecessarily cumbersome if it is too long. Consequently, it is often necessary to have carpenter's levels of varying lengths for a particular job.

Extensible carpenter's levels have been advanced in an attempt to eliminate the need to carry several carpenter's levels of varying lengths. However, known extensible carpenter's levels are unnecessarily complicated and expensive to manufacture. Consequently, a need exists for a stable, extensible carpenter's level which is easy to use and manufacture.

The present invention provides an improved extensible carpenter's level which is slidably adjustable between a collapsed position and a fully-extended position. The reference edges of the level remain substantially aligned in the same plane regardless of the position of the level. A preferred embodiment of the level includes an innerslide, a first outerslide, and a second outerslide. The innerslide has a first set of tracks and a second set of tracks. The outerslides are slidably connected to the innerslide. The first outerslide and the second outerslide are preferably adapted to slide independently each other. The first outerslide is adapted to slide along the first set of tracks, and the second outerslide is adapted to slide along the second set of tracks. At least one of the slides includes at least one level bubble. Different types of level bubbles may be mounted in the same level to allow for a variety of measurements. For example, one level may include a horizontal level bubble, a vertical level bubble, and a level bubble that measures a predetermined angle, e.g., 30°.

The cross section of the innerslide may be generally I-shaped. The first set of tracks is preferably comprised of a first track on a top side of the innerslide and a second track on a bottom side of the innerslide. In addition, the second set of tracks is preferably comprised of a third track on the top side of the innerslide and a fourth track on the bottom side of the innerslide. However, it should be recognized that the level may have any appropriate number of tracks located in any appropriate positions on the innerslide.

The first outerslide is preferably comprised of a first extension member which is connected to a first end member. The first extension member may be longer than the first end member. The first extension member preferably has a first tongue which is adapted to slide in the first track and a second tongue which is adapted to slide in the second track. On the other hand, the first end member preferably has a third tongue which is adapted to slide in the third track and a fourth tongue which is adapted to slide in the fourth track. The second outerslide is preferably similar to, but opposing, the first outerslide. The second outerslide is preferably comprised of a second extension member which is connected to a second end member. The second extension member may be longer than the second end member. The second extension member preferably has a fifth tongue and a sixth tongue, wherein the fifth tongue is adapted to slide in the third track and the sixth tongue is adapted to slide in the fourth track. Furthermore, the second end member preferably has a seventh tongue which is adapted to slide in the first track and an eighth tongue which is adapted to slide in the second track. The first extension member preferably abuts the second end member and the second extension member preferably abuts the first end member when the carpenter's level is in the collapsed position.

The level may be magnetized. For example, any of the slides may be made from a magnetized material. For another example, one or more magnets may be secured to any of the slides. Preferably, a magnetic strip is adhered to a reference edge of the level. Magnetization preferably helps to hold the reference edge of the level securely against an appropriate surface, e.g., a metal surface, that is being measured. It also preferably helps to prevent the level from falling off a suitable surface during a measurement.

The carpenter's level preferably includes means for releasably locking the position of at least one of the outerslides relative to the innerslide at predetermined intervals. This feature preferably facilitates the use of the level at intermediate lengths between the collapsed position and the fully-extended position. The means may be a spring-loaded ball bearing or pin that is releasably engaged by grooves, cutouts, or notches that are spaced at predetermined intervals on the innerslide or either of the outerslides. It is preferred that a user can disengage the spring-loaded ball bearing or pin by sliding the outerslide relative to the innerslide.

Another embodiment of the level is similar to the embodiment described above except that the innerslide has tongues. In this embodiment, the innerslide has a first set of tongues and a second set of tongues. The first outerslide is slidably connected to the innerslide, and it is adapted to slide along the first set of tongues. The second outerslide is also slidably connected to the innerslide, and it is adapted to slide along the second set of tongues. At least one of the slides includes at least one level bubble.

The first set of tongues may be comprised of a first tongue on a top side of the innerslide and a second tongue on a bottom side of the innerslide. The second set of tongues may be comprised of a third tongue on the top side of the innerslide and a fourth tongue on the bottom side of the innerslide. In such an embodiment, the first outerslide preferably has a first extension member which is connected to a first end member, and the second outerslide preferably has a second extension member which is connected to a second end member. The first extension member has a first track which is adapted to slide along the first tongue and a second track which is adapted to slide along the second tongue. The first end member has a third track which is adapted to slide along the third tongue. The first end member also has a fourth track which is adapted to slide along the fourth tongue. On the other hand, the second extension member has a fifth track which is adapted to slide along the third tongue and a sixth track which is adapted to slide along the fourth tongue. Furthermore, the second end member has a seventh track which is adapted to slide along the first tongue and an eighth track which is adapted to slide along the second tongue.

This embodiment may also include the optional and preferred features of the first embodiment.

In addition to the novel features and advantages mentioned above, other objects and advantages of the present invention will be readily apparent from the following descriptions of the drawings and preferred embodiments.

BRIEF DESCRIPTION OF THE DRAWINGS

FIG. 3A is a detailed side elevation view of the level of FIG. 1;

FIG. 3B is a detailed elevation view of the left end of the level of FIG. 3A;

FIG. 3C is a detailed cross section view along C—C of FIG. 3A;

FIG. 8A is a detailed side elevation view of an extension member of the outerslide of FIG. 4A;

FIG. 8B is a detailed elevation view of the left end of the extension member of FIG. 8A;

FIG. 10A is a detailed side elevation view of an outerslide mounting assembly for a level bubble of the level of FIG. 1;

FIG. 10B is a detailed elevation view of an end cap of the outerslide mounting assembly of FIG. 10A;

FIG. 10C is a detailed cross section view along A—A of FIG. 10B;

FIG. 10D is a detailed cross section view along B—B of FIG. 10C;

FIG. 10E is a detailed cross section view along C—C of FIG. 10D;

FIG. 15A is a detailed side elevation view of a plunge block of the level of FIG. 1;

FIG. 15B is a detailed elevation view of the left end of the plunge block of FIG. 15A;

FIG. 15C is a detailed cross section view along A—A of FIG. 15A;

DETAILED DESCRIPTION OF PREFERRED EMBODIMENT(S)

Figure 1:
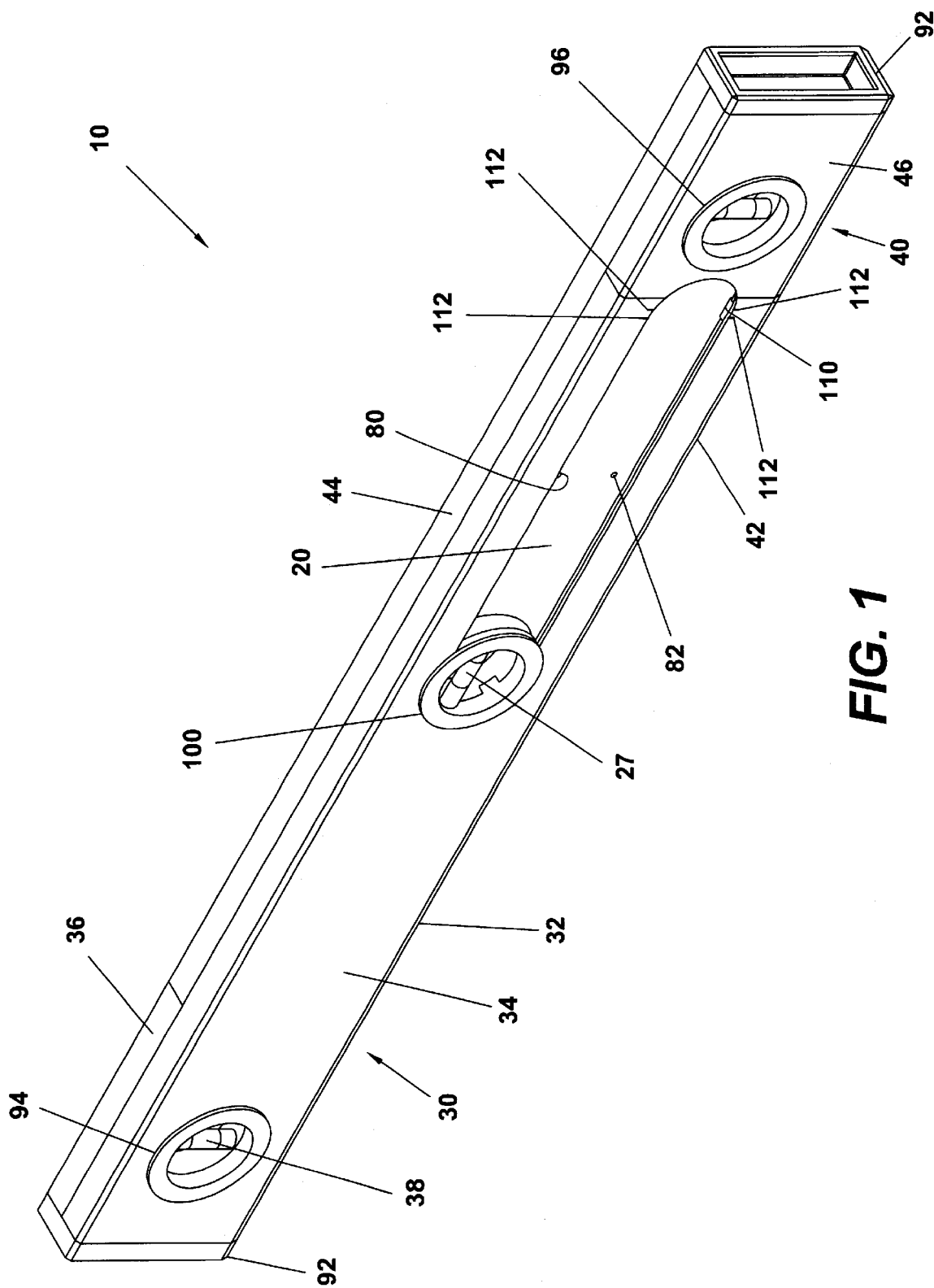
FIG. 1 is a perspective view of a first preferred embodiment of an extensible carpenter's level of the present invention.

The present invention is directed to an improved extensible carpenter's level which is slidably adjustable between a collapsed position and a fully extended position. FIGS. 1, 2A–2C, and 3A–3C illustrate a preferred embodiment of the extensible carpenter's level 10 in a collapsed position. FIGS. 4A–4B, 5, 6A–6B, 7A–7B, 8A–8B, 9A–9B, 10A–10E, 11A–11C, 12A–12B, 13A–13D, 14A–14B, 15A–15C, 16A–16C illustrate various views, some detailed, of the components of the level 10. In this embodiment, the level 10 includes an innerslide 20, a first outerslide 30, and a second outerslide 40. The first outerslide 30 and the second outerslide 40 are slidably connected to the innerslide 20. In addition, the reference edge 32 of the first outerslide 30 and the reference edge 42 of the second outerslide 40 remain substantially aligned in the same plane regardless of the position of the extensible carpenter's level 10.

The slides 20, 30, 40 may be made from any suitable material. For example, the slides 20, 30, 40 may be from aluminum or plastic. In addition, the slides 20, 30, 40 may be manufactured using any appropriate technique, e.g. extrusion or molding.

Figures 4A, 4B:
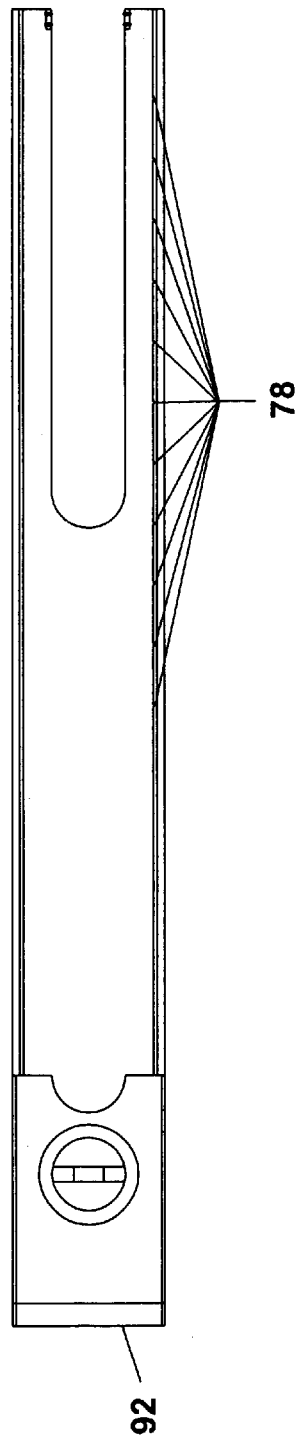
FIG. 4A is a side elevation view of an outerslide of the level of FIG. 1.
FIG. 4B is an elevation view of the right end of the outerslide of FIG. 4A.
Figure 5:
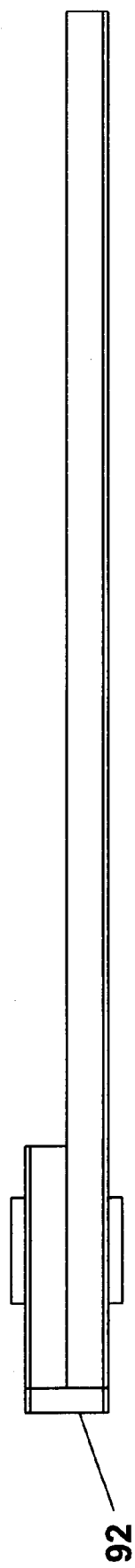
FIG. 5 is a bottom plan view of the outerslide of FIG. 4A.
Figure 6A:
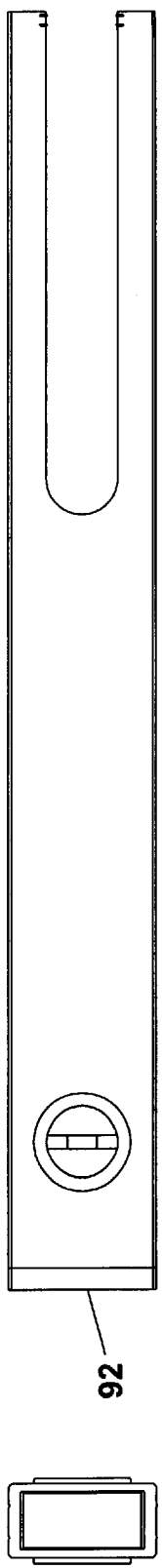
FIG. 6A is another side elevation view of the outerslide of FIG. 4A.
Figure 6B:
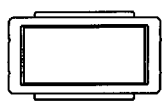
FIG. 6B is an elevation view of the left end of the outerslide of FIG. 6A.
Figure 7A:
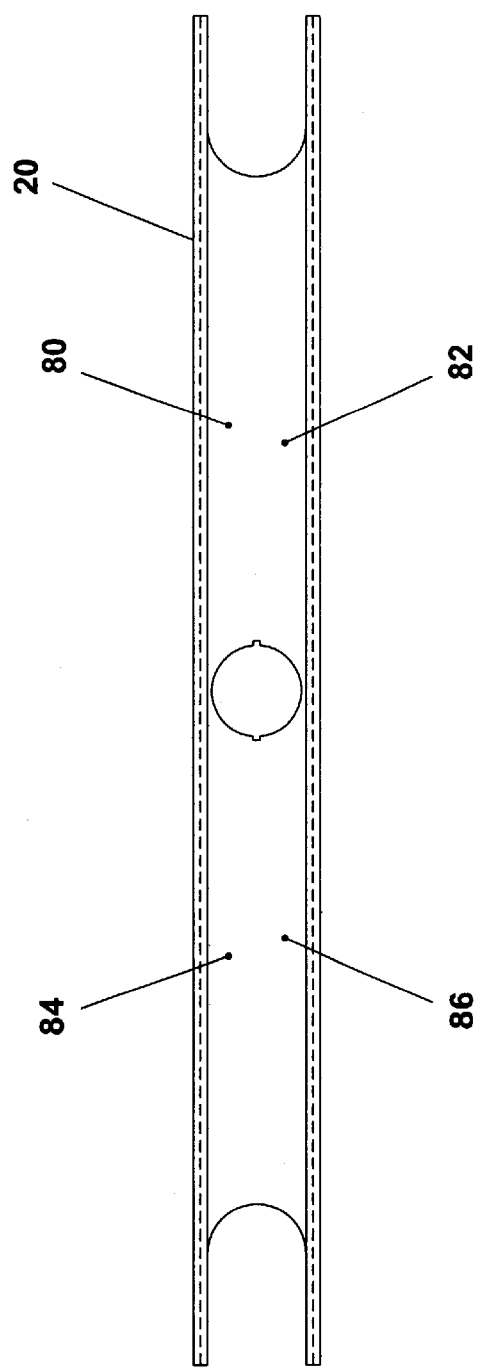
FIG. 7A is a detailed side elevation view o f the innerslide of the level of FIG. 1.
Figure 7B:
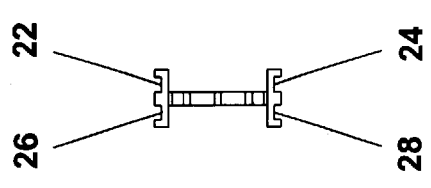
FIG. 7B is a detailed elevation view of the left end of the innerslide of FIG. 7A.
Figure 9A:
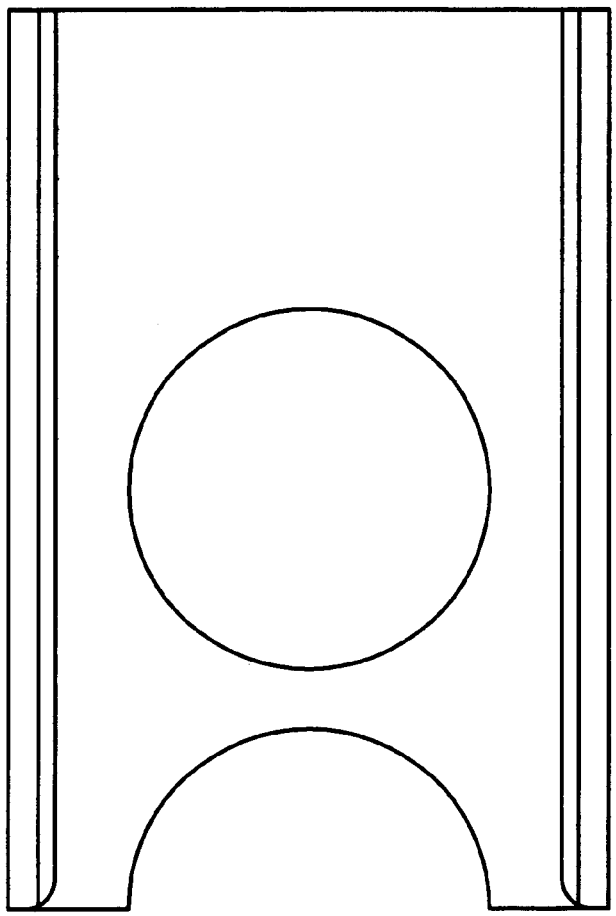
FIG. 9A is a detailed side elevation view of an end member of the outerslide of FIG. 4A.
Figure 9B:
FIG. 9B is a detailed elevation view of the left end of the end member of FIG. 9A.

In this embodiment, the first outerslide 30 abuts against the second outerslide 40 in the collapsed position. The first outerslide 30 and the second outerslide 40 may be slid independently of one another. The innerslide 20 has a first and second set of tracks. FIG. 7B most clearly shows the tracks. The first set of tracks is comprised of track 22 and track 24, and the second set of tracks is comprised of track 26 and track 28. The first outer slide 30 and the second outerslide 40 have tongues that are adapted to slide in the tracks 22, 24, 26, 28. FIG. 4B shows the tongues 52, 54, 56, 58 of one outerslide. The tongues 52, 54, 56, 58 are adapted to slide in the tracks 22, 24, 26, 28. It should be understood that the tongues 52, 54, 56, 58 can slide in the tracks 22, 24, 26, 28 with or without making contact with the tracks 22, 24, 26, 28. By pulling on opposite ends of the level 10, a user can cause the outerslides 30, 40 to slide in opposite directions relative to the innerslide 20 such that the level 10 moves from the collapsed position into a fully extended position.

Figures 2A, 2B, 2C:
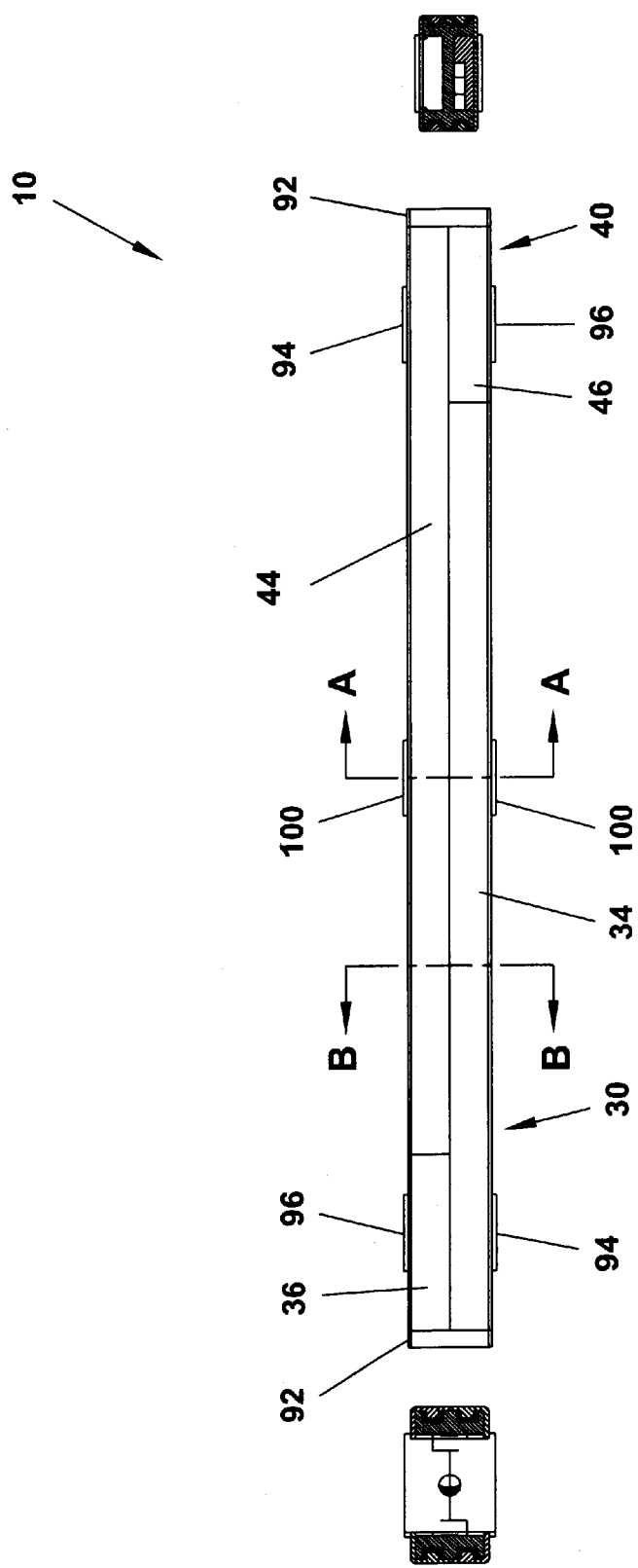
FIG. 2A is a top plan view of the level of FIG. 1.
FIG. 2B is a cross section view along A—A of FIG. 2A.
FIG. 2C is a cross section view along B—B of FIG. 2A.
Figure 14B:
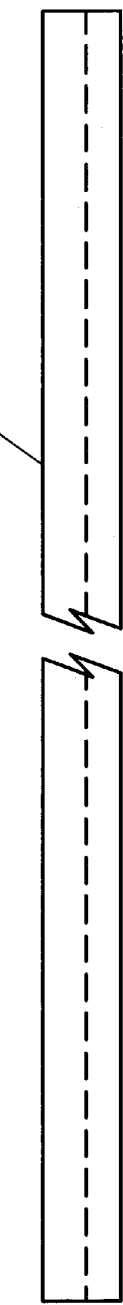
FIG. 14B is a detailed side elevation view of the optional track member of FIG. 14A.
Figure 14A:
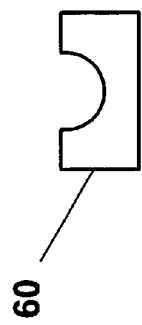
FIG. 14A is a detailed end elevation view of an optional track member of the innerslide of the level of FIG. 1.

FIGS. 14A–14B show an optional track member 60 which may be inserted in the tracks 22, 24, 26, 28. A preferred embodiment of the track member 60 slidably mates with a corresponding tongue so that the level 10 is stable when it is being adjusted from one position to another. A track member 60 may be secured in each of the tracks 22, 24, 26, 28 by conventional means, e.g. by mechanical fastening means such as a screw or by an adhesive. In an alternative embodiment, a track member 60 may be integral to the innerslide 20. FIGS. 2B, 2C, and 3C show the relationship between the track members 60 and the tongues of the outerslides 30, 40.

In addition, the extensible carpenter's level 10 is preferably extendible in increments between a collapsed position and a fully extended position. It is preferred that the extensible carpenter's level 10 includes at least one locking device which is adapted to releasably lock the position of at least one of the outerslides 30, 40 relative to the innerslide 20 at predetermined intervals between the collapsed position and the fully-extended position. An example of a locking device comprises a spring-loaded ball bearing, pin, or any other suitably-shaped object which is releasably engaged by grooves, notches, or cutouts spaced at predetermined intervals on the innerslide 20 or one of the outerslides 30, 40. FIGS. 15A–15B show various views of a preferred embodiment of a plunge block 70. The plunge block 70 includes a chamber 72 which is adapted to house a spring-loaded ball bearing, pin, etc. In this embodiment, a plunge block 70 is secured to each side of the innerslide 20 via screws or rivets which extend through hole 74 and hole 76 of each plunge block 70. FIGS. 1, 3A, and 7A show corresponding holes 80, 82, 84, 86 that receive the screws or rivets from the plunge blocks 70. It should also be recognized that a plunge block 70 may be secured to the innerslide 20 or an outerslide by any other appropriate means, e.g., by an adhesive. FIGS. 4A and 8A show the notches 78 of one outerslide which are adapted to releasably engage a respective spring-loaded ball bearing as the outerslide slides relative the innerslide 20.

At least one of the slides has a level bubble. It is preferred that the innerslide 20, the first outerslide 30, and the second outerslide 40 each include at least one level bubble. In the embodiment shown in FIGS. 1, the innerslide 20 has a level bubble 27, the first outerslide 30 has a level bubble 38, and the second outerslide 40 has a level bubble 48. Each of the level bubbles is preferably visible in all collapsed and extended positions. Moreover, the level bubbles are preferably mounted in their respective vial housings at different predetermined orientations relative to the reference edges in order to allow a variety of measurements. For example, one level bubble may function as a horizontal level, a second level bubble may function as a vertical level, and a third level bubble may function as a 45 degree level.

In order to facilitate manufacturing of the extensible carpenter's level 10, it is preferred that the first outerslide 30 and the second outerslide 40 are substantially identical. In the embodiment shown in FIG. 1, the first outerslide 30 is substantially identical to the second outerslide 40. The first outerslide 30 has an extension member 34, and the second outerslide 40 has an extension member 44. In addition, the first outerslide 30 preferably has an end member 36, and the second outerslide 40 preferably has an end member 46.

FIGS. 4A–4B, 5, and 6A–6B illustrate an outerslide which is representative of both the first outerslide 30 and the second outerslide 40 of the extensible carpenter's level 10 of FIGS. 1 through 3. FIGS. 8A–8B show an extension member of the outerslide of FIGS. 4A–4B, 5, and 6A–6B, and FIGS. 9A–9B illustrate an end member of the outerslide of FIGS. 4A–4B, 5, and 6A–6B. FIGS. 7A–7B show the innerslide 20 of the extensible carpenter's level 10.

Figure 11C:
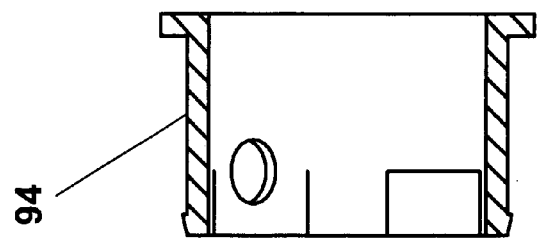
FIG. 11C is a detailed cross section view along A—A of FIG. 11B.
Figure 11B:
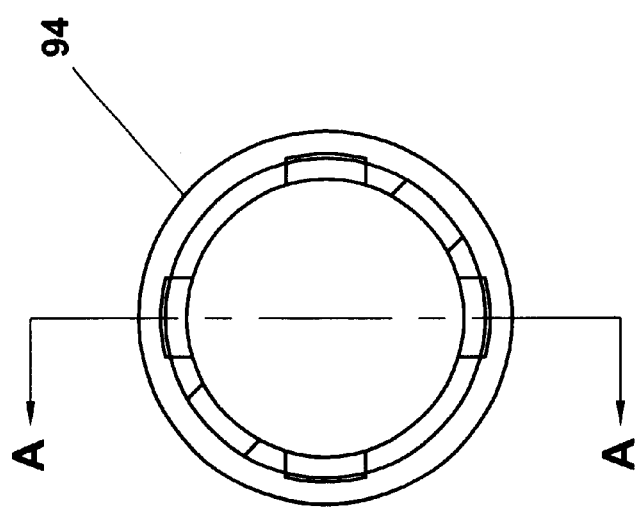
FIG. 11B is a detailed elevation view of the right end of the vial housing of FIG. 11A.
Figure 11A:
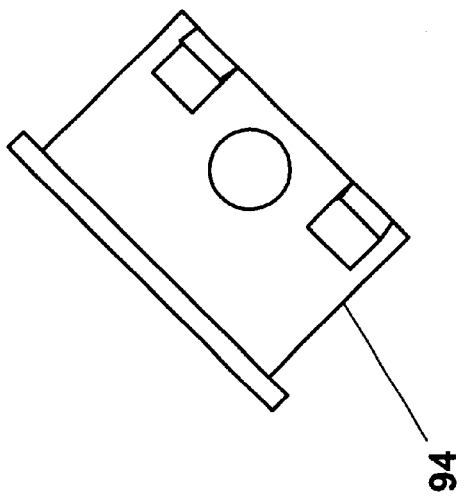
FIG. 11A is a detailed side elevation view of a vial housing which is adapted to be mounted in the outerslide mounting assembly of FIG. 10A.
Figure 12B:
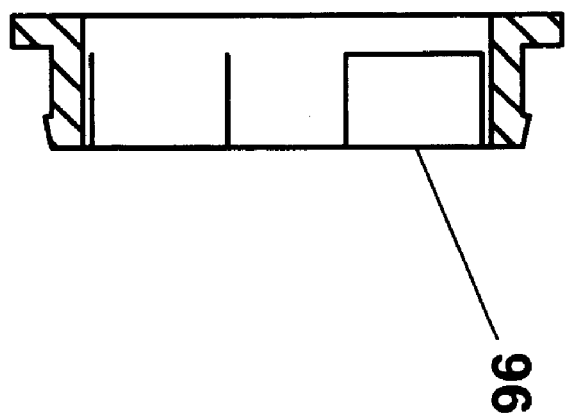
FIG. 12B is a detailed cross section view along A—A of FIG. 12A.
Figure 12A:
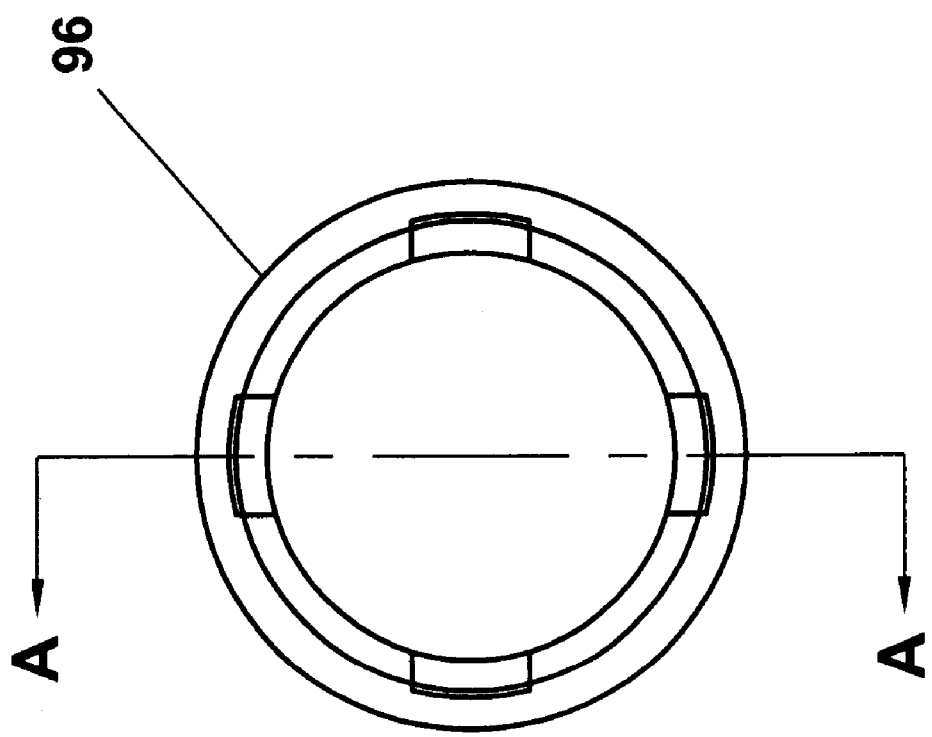
FIG. 12A is a detailed elevation view of an end of a vial housing mate for the vial housing of FIG. 11A.
Figure 13C:
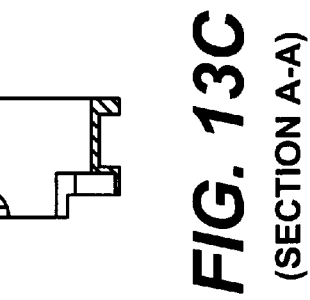
FIG. 13C is a detailed cross section view along A—A of FIG. 13B.
Figure 13D:
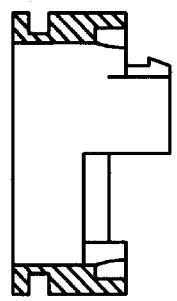
FIG. 13D is a detailed cross section view along B—B of FIG. 13B.
Figure 13B:
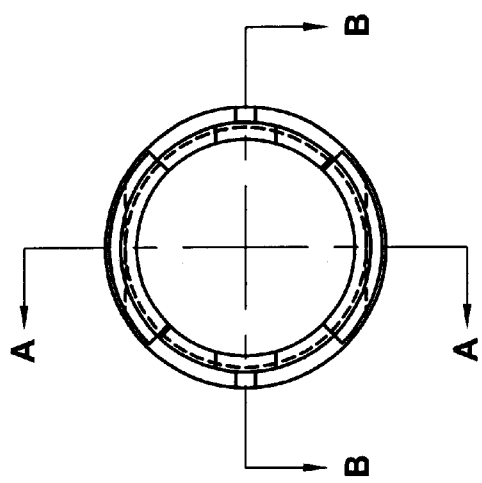
FIG. 13B is a detailed elevation view of an end of the vial housing of FIG. 13A.
Figure 13A:
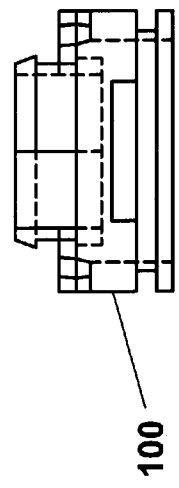
FIG. 13A is a detailed side elevation view of a vial housing which is adapted to be mounted on the innerslide of the level of FIG. 1.

FIGS. 10A–10E show an outerslide mounting assembly 90 for a level bubble. The outerslide mounting assembly 90 includes an end cap 92. The end cap 92 is preferably made of rubber or a similar material. FIGS. 11A–11C show a vial housing 94, and FIGS. 12A–12B show a vial housing mate 96. Vial housing 94 and vial housing mate 96 are adapted to be mounted in the outerslide mounting assembly 90. The outerslide mounting assembly 90, vial housing 94, and vial housing mate 96 are preferably adapted to secure the end members to the extension members of the outerslides. However, it should be recognized that an extension member may be integrally connected to an end member.

FIGS. 13A–13D show another vial housing 100 which is adapted to be mounted on the innerslide 20.

A transparent shield, i.e., glass or plastic, may extend over the vial housings to protect the level bubbles. Also, the vial housings may be raised from, flush with, or below the surface of the outerslides.

Figure 16C:
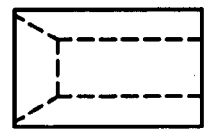
FIG. 16C is a detailed elevation view of an end of the stop of FIG. 16A.
Figure 16A:
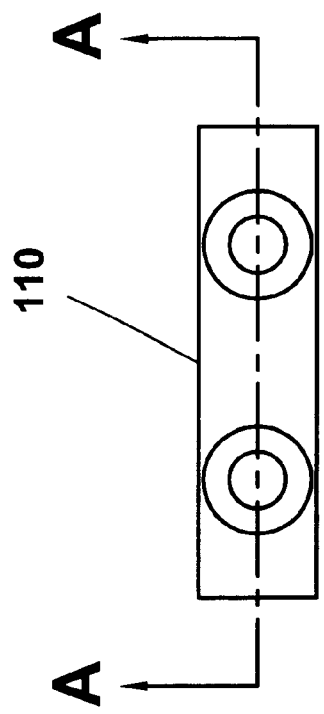
FIG. 16A is a detailed side elevation view of a stop of the level of FIG. 1.
Figure 16B:
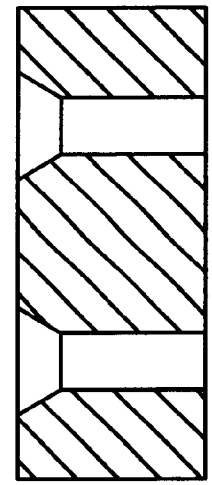
FIG. 16B is a detailed cross section view along A—A of FIG. 16A.

FIGS. 16A–16C show a stop 110. Stops 110 are preferably adapted to abut respective plunge blocks 70 in the fully extended position. In this embodiment, the stops 110 are secured to the extension members by screws or rivets through holes 112. However, it should be recognized that the stops 110 may be secured to the extension members by any suitable means, e.g., integrally connected.

Figure 17:
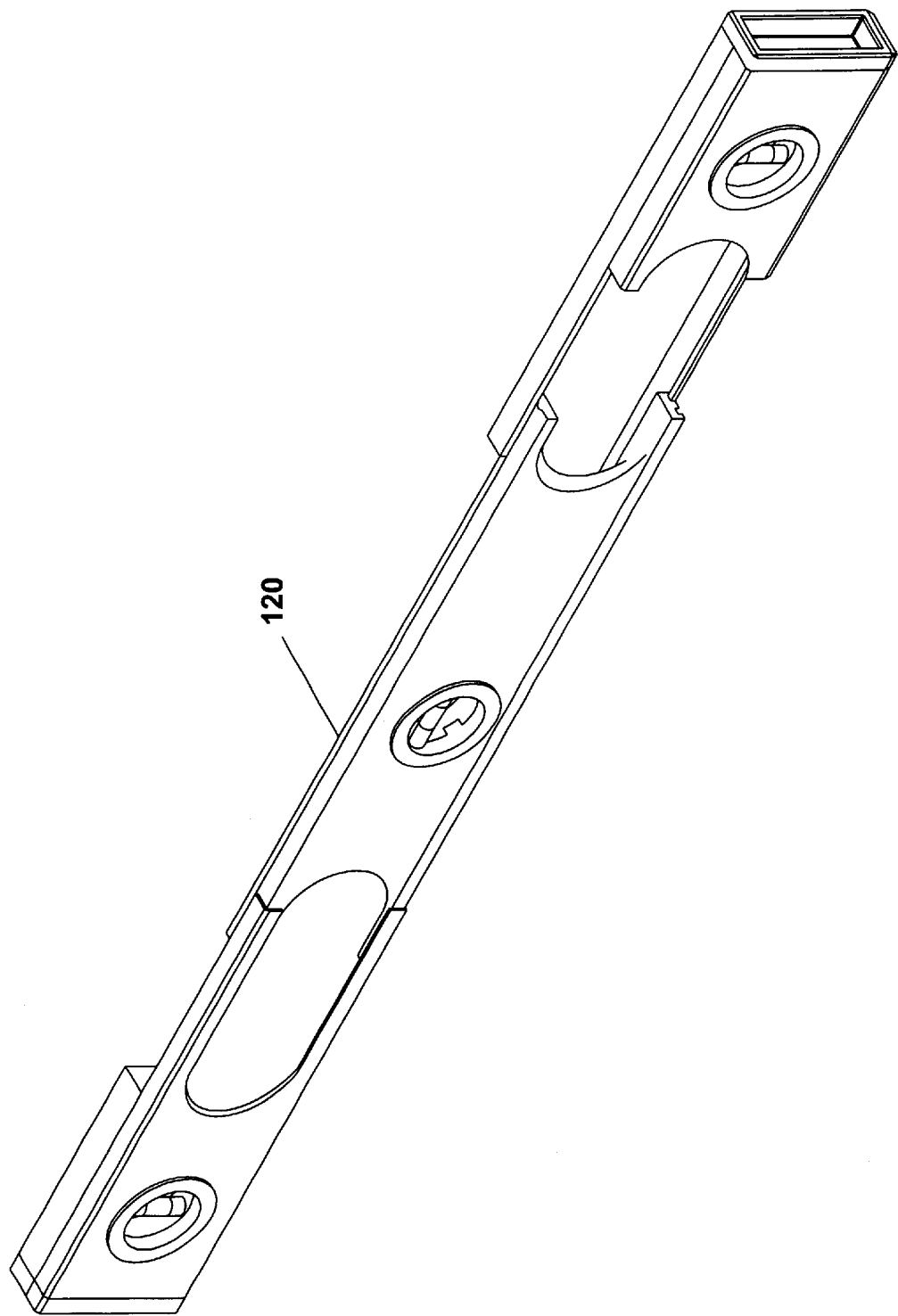
FIG. 17 is a perspective view of a second preferred embodiment of a level of the present invention in a fully-extended position.

FIG. 17 shows another embodiment of a level 120 of the present invention in a fully extended position.

Figure 18:
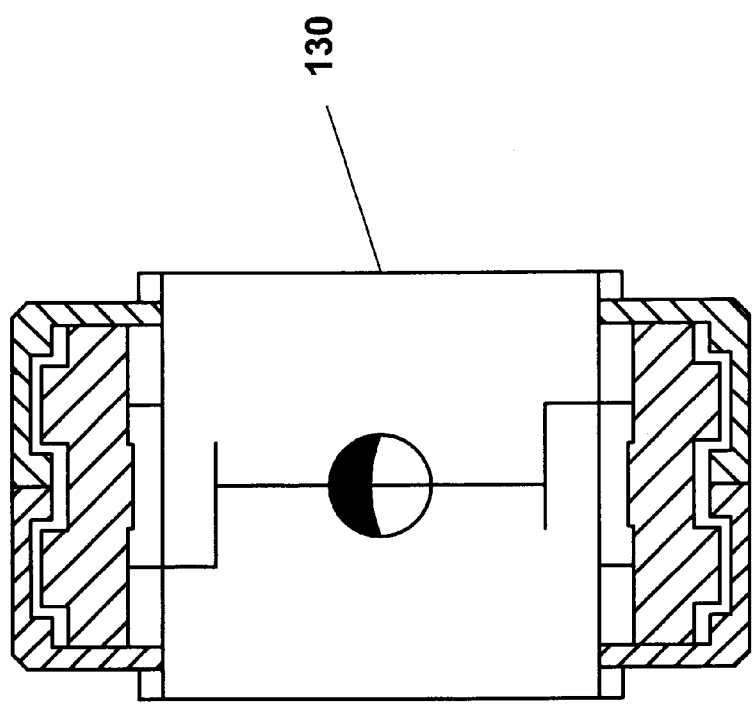
FIG. 18 is a cross section view of a third preferred embodiment of a level of the present invention.

FIG. 18 shows another embodiment of a level 130 of the present invention in which the innerslide has tongues and the outerslides have tracks.

Figure 19:
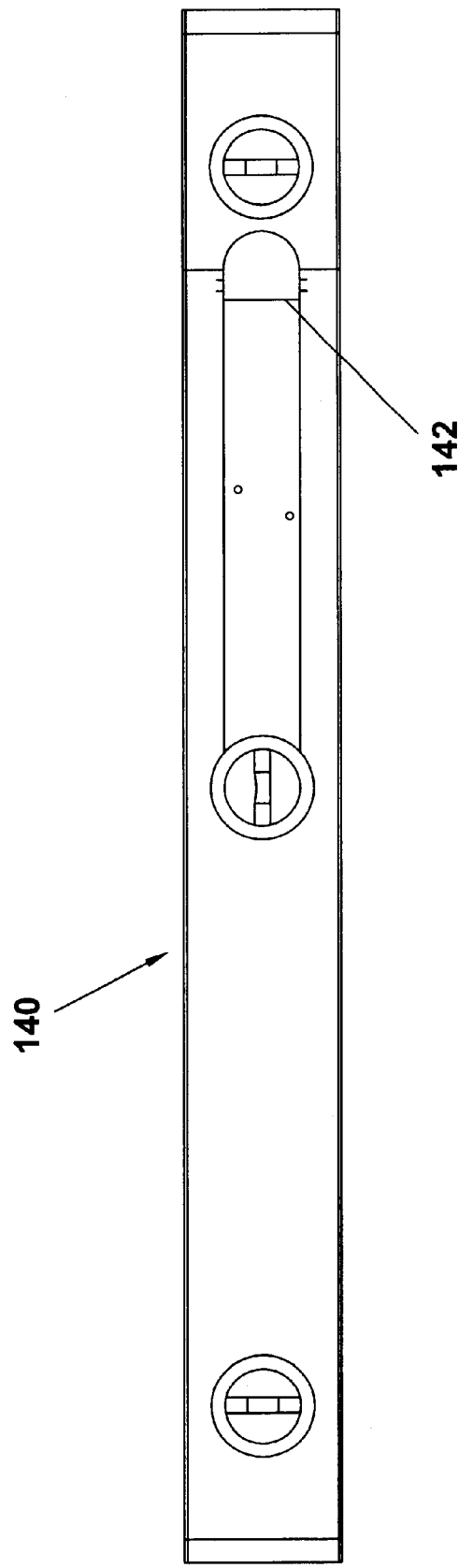
FIG. 19 is a side elevation view of a fourth preferred embodiment of a level of the present invention.

FIG. 19 shows yet another embodiment of a level 140 of the present invention in which a stop 142 extends from a top portion to a bottom portion of an extension member.

It should be recognized that many of figures indicate dimensions such as lengths, widths, and heights for a preferred embodiment of the present invention. Nevertheless, the dimensions are not pertinent to the patentability of the present invention. Those skilled in the art will recognize that the present invention may have dimensions other than those indicated by figures. For instance, the length of one embodiment of the present invention may be adjustable between 6 inches and 12 inches, and the length of another embodiment of the present invention may be adjustable between 4 feet and 8 feet.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A carpenter's level adjustable between a collapsed position and a fully-extended position, said carpenter's level comprising:

an innerslide including a first level bubble, said innerslide having a top portion and a bottom portion, said top portion of said innerslide defining a first track and a third track and said bottom portion of said innerslide defining a second track and a fourth track, said first track and said second track being a first set of tracks, said third track and said fourth track being a second set of tracks;

a first outerslide slidably connected to said innerslide on said first set of tracks, said first outerslide adapted to slide only on one side of said top portion and one side of said bottom portion, said first outerslide including a second level bubble, said first outerslide having a first extension member and a first end member, said first extension member connected to said first end member, said first extension member having a first tongue which is adapted to slide in said first track, said first extension member also having a second tongue which is adapted to slide in said second track, said first end member having a third tongue which is adapted to slide in said third track, said first end member also having a fourth tongue which is adapted to slide in said fourth track; and a second outerslide slidably connected to said innerslide on said second set of tracks, said second outerslide adapted to slide only on one side of said top portion and one side of said bottom portion, said second outerslide including a third level bubble, said second outerslide having a second extension member and a second end member, said second extension member connected to said second end member, said second extension member having a fifth tongue which is adapted to slide in said third track, said second extension member also having a sixth tongue which is adapted to slide in said fourth track, said second end member having a seventh tongue which is adapted to slide in said first track, said second end member also having an eighth tongue which is adapted to slide in said second track.

2. The carpenter's level of claim 1 wherein at least one of said first, second, and third level bubbles is a horizontal level bubble.

3. The carpenter's level of claim 1 wherein at least one of said first, second, and third level bubbles is a vertical level bubble.

4. The carpenter's level of claim 1 wherein said first extension member abuts said second end member and said second extension member abuts said first end member when said carpenter's level is in said collapsed position.

5. The carpenter's level of claim 1 wherein:

said first extension member is longer than said first end member; and said second extension member is longer than said second end member.

6. The carpenter's level of claim 1 wherein the cross section of said innerslide is generally I-shaped.

7. The carpenter's level of claim 1 wherein said carpenter's level is magnetized.

8. The carpenter's level of claim 1 wherein said first outerslide and said second outerslide are adapted to slide independently of one another.

9. The carpenter's level of claim 1 further comprising means for releasably locking the position of at least one of said outerslides relative to said innerslide at predetermined intervals.

10. The carpenter's level of claim 1 wherein:

said first track is on a top side of said top portion of said innerslide;

said second track is on a bottom side of said bottom portion of said innerslide;

said third track is on said top side of said top portion of said innerslide; and said fourth track is on said bottom side of said bottom portion of said innerslide.

11. The carpenter's level of claim 1 wherein said first track, said second track, said third track, and said fourth track are comprised of plastic.

12. The carpenter's level of claim 1 wherein:

said second level bubble is mounted in said first outerslide such that said first extension member is secured to said first end member; and said third level bubble is mounted in said second outerslide such that said second extension member is secured to said second end member.

13. The carpenter's level of claim 1 wherein said first extension member is adjacent said second extension member.

14. A carpenter's level adjustable between a collapsed position and a fully-extended position, said carpenter's level comprising:

an innerslide including a first level bubble, said innerslide having a top portion and a bottom portion, said top portion of said innerslide defining a first tongue and a third tongue and said bottom portion of said innerslide defining a second tongue and a fourth tongue, paid first tongue and said second tongue being a first set of tongues, said third tongue and said fourth tongue being a second set of tongues;

a first outerslide slidably connected to said innerslide on said first set of tongues, said first outerslide adapted to slide only on one side of said top portion and one side of said bottom portion, said first outerslide including a second level bubble, said first outerslide having a first extension member and a first end member, said first extension member connected to said first end member, said first extension member having a first track which is adapted to slide along said first tongue, said first extension member also having a second track which is adapted to slide along said second tongue, said first end member having a third track which is adapted to slide along said third tongue, said first end member also having a fourth track which is adapted to slide along said fourth tongue; and a second outerslide slidably connected to said innerslide on said second set of tongues, said second outerslide adapted to slide only on one side of said top portion and one side of said bottom portion, said second outerslide including a third level bubble, said second outerslide having a second extension member and a second end member, said second extension member connected to said second end member, said second extension member having a fifth track which is adapted to slide along said third tongue, said second extension member also having a sixth track which is adapted to slide along said fourth tongue, said second end member having a seventh track which is adapted to slide along said first tongue, said second end member also having an eighth track which is adapted to slide along said second tongue.

15. The carpenter's level of claim 14 wherein said first extension member abuts said second end member and said second extension member abuts said first end member when said carpenter's level is in said collapsed position.

16. The carpenter's level of claim 14 wherein:

said first extension member is longer than said first end member; and said second extension member is longer than said second end member.

17. The carpenter's level of claim 14 wherein:

said first tongue is on a top side of said top portion of said innerslide;

said second tongue is on a bottom side of said bottom portion of said innerslide;

said third tongue is on said top side of said top portion of said innerslide; and said fourth is on said bottom side of said bottom portion of said innerslide.

18. The carpenter's level of claim 14 wherein:

said second level bubble is mounted in said first outerslide such that said first extension member is secured to said first end member; and said third level bubble is mounted in said second outerslide such that said second extension member is secured to said second end member.

19. The carpenter's level of claim 14 wherein said first extension member is adjacent said second extension member.

20. The carpenter's level of claim 14 wherein said first track, said second track, said third track, and said fourth track are comprised of plastic.

21. The carpenter's level of claim 14 wherein the cross section of said innerslide is generally I-shaped.

22. The carpenter's level of claim 14 wherein said carpenter's level is magnetized.

23. The carpenter's level of claim 14 wherein said first outerslide and said second outerslide are adapted to slide independently of one another.

24. The carpenter's level of claim 14 further comprising means for releasably locking the position of at least one of said outerslides relative to said innerslide at predetermined intervals.

* * * * *